United States Patent [19]

Pitesky

[11] 4,324,423

[45] Apr. 13, 1982

[54] TUBULAR FITMENT

[76] Inventor: Isadore Pitesky, 4001 Linden Ave., Long Beach, Calif. 90807

[21] Appl. No.: 177,361

[22] Filed: Aug. 11, 1980

Related U.S. Application Data

[63] Continuation of Ser. No. 14,683, Feb. 23, 1979, abandoned.

[51] Int. Cl.³ .............................................. F16L 41/00
[52] U.S. Cl. .................................. 285/156; 285/174; 285/179; 285/212; 285/354; 285/414
[58] Field of Search .............. 285/212, 220, 354, 388, 285/387, 174, 414, 156, 179

[56] References Cited

U.S. PATENT DOCUMENTS

| | | | |
|---|---|---|---|
| 2,661,965 | 12/1953 | Parmesan | 285/347 X |
| 2,926,029 | 2/1960 | St. Clair et al. | 285/256 |
| 3,074,748 | 1/1963 | Ulrich | 285/212 X |
| 3,082,844 | 3/1963 | MacDonald, Jr. | 285/354 X |
| 3,142,358 | 7/1964 | Woerheide, Jr. | 285/189 X |
| 3,476,414 | 11/1969 | Condrac | 285/354 X |
| 3,759,552 | 9/1973 | Levinsohn et al. | 285/212 X |

FOREIGN PATENT DOCUMENTS 562641  12/1957  Belgium ............................. 285/354

Primary Examiner—Thomas F. Callaghan
Attorney, Agent, or Firm—William C. Babcock

[57] ABSTRACT

A tubular fitment capable of establishing a fluid tight passage defining a connection between first and second confined space defining means, with the tubular fitting when in a first condition permitting the second confined space defining means and a second portion of the tubular fitment to be rotated relative to a first portion of the tubular fitment and the first confined space defining means, and the tubular fitment when in a second condition locking the first and second portions thereof in fixed positions relative to one another.

6 Claims, 7 Drawing Figures

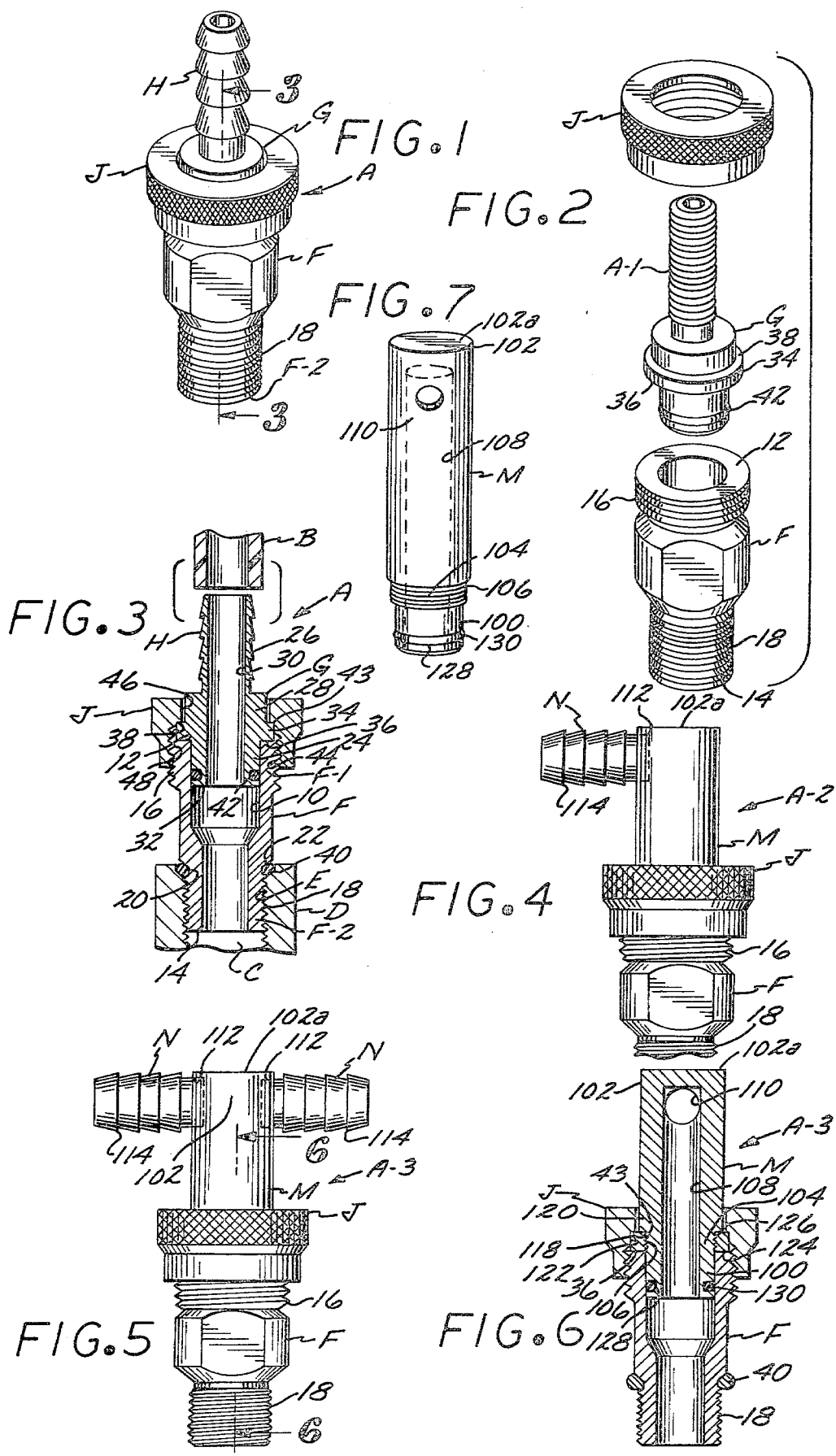

TUBULAR FITMENT

This is a continuation of application Ser. No. 014,683, filed Feb. 23, 1979 and now abandoned.

BACKGROUND OF THE INVENTION

1. Field of the Invention

Tubular Fitment.

2. Description of the Prior Art

In certain applications, particularly in laboratories, it is desirable to have available a tubular fitment to so establish communication between first and second confined space defining means that they may be rotated relative to one another due to movement of first and second portions of the tubular fitment, but if desired the first and second portions being removably held in locked position relative to one another. Prior to the present invention there has not been available a tubular fitment of simple mechanical structure in which first and second portions thereof slidably, sealingly and rotatably engage one another, but that may be locked in fixed positions relative to one another by a simple manual operation.

A major object of the present invention is to supply a tubular fitment that overcomes the operational disadvantages of prior devices of this nature, is easy to use, has simple mechanical structure, and requires a minimum of maintenance attention.

Another object of the invention is to provide a tubular fitment in which first and second fluid conveying portions thereof may be rotated while maintaining a fluid-tight seal, or if desired the first and second portions removably locked in fixed positions relative to one another.

SUMMARY OF THE INVENTION

The tubular fitment of the present invention is capable of establishing a fluid-tight connection between first and second defining means in such a manner that the second defined space defining means may be rotated relative to the first confined space defining means, or if desired the tubular fitment may have the first and second portions thereof locked in fixed positions relative to one another. The tubular fitment may have either a second portion that includes an externally barbed tubular member that engages the interior of a resilient tube, or with the second portion being threaded to engage a tapped tubular member. Irrespective of the means of attaching to the second confined space defining means, the second portion may be rotated relative to the first portion without disturbing the seal therebetween or the first or second portions of the invention may be locked in a fixed position relative to one another by rotating a collar that forms a part of the tubular fitment.

The tubular fitment includes a first elongate tubular member that has first and second end portions that have a longitudinal smooth surfaced first bore extending therebetween. The first and second end portions have first and second transverse ring-shaped surface extremities, with the first end portion having first external threads defined thereon, and the second end portion having external threads defined thereon that extend longitudinally from a second ring-shaped surface extremity to a transverse circumferentially extending first groove in the second end portion. A part of the first groove most remote from the second transverse ring-shaped extremity defines a first circumferentially extending body shoulder.

A second elongate tubular member is provided that has third and fourth end portions and an intermediate portion situated therebetween. A longitudinal passage is formed in the second elongate tubular member that extends between the third and fourth end portions thereof. The third end portion is of circular transverse cross-section and is of such size as to snugly and slidably engage the first longitudinal bore adjacent the first end. A second circumferentially extending groove is formed in the third end portion. First means are on the fourth end portion for sealing engaging the second confined space defining means which may be a resilient tube, tapped or welded tubular member. A circumferentially extending flange projects outwardly from the intermediate portion with the flange having first and second longitudinally spaced ring-shaped end faces.

First and second resilient sealing rings are disposed in the first and second grooves. The first resilient sealing ring is compressed and effects the fluid-tight seal between the body shoulder and the rigid material adjacent the tapped bore in the first confined space defining means when the second threads are screwed into the tapped bore. The second resilient sealing rings effect a rotatable and slidable seal between the third end portion and the first longitudinal bore when the third end portion is slid longitudinally into the latter to dispose the first ring-shaped space adjacent the first ring-shaped end surface.

A ring-shaped collar is provided that has an internal circular abutment from which second and third bores extend longitudinally in opposite directions. The third bore has third threads defined therein, with the third bore capable of being slid downwardly over the flange for the third threads to engage the first threads. The second tubular member and resilient tubing connected thereto are capable of being rotated relative to the first tubular member until such time as the collar is screwed downwardly on the first threads to the extent that the first and second ring-shaped faces of the flange are frictionally gripped between the first ring-shaped surface and the abutment to the extent rotation of the second tubular member relative to the first tubular member is no longer possible.

BRIEF DESCRIPTION OF THE DRAWINGS

FIG. 1 is a perspective view of the tubular fitment, that has a barbed connection thereon for engagement by a resilient tube;

FIG. 2 is an exploded perspective view of the tubular fitment as shown in FIG. 1, but with threads being defined on the upper portion thereof instead of barbs, with the threads being connectable to an internally tapped tubular member;

FIG. 3 is a longitudinal cross-sectional view of the tubular fitment as shown in FIG. 1 and taken on the line 3—3 thereof;

FIG. 4 is a side elevational view of a first modified form of the invention;

FIG. 5 is a side elevational view of a second modified form of the invention;

FIG. 6 is a longitudinal cross-sectional view of the second modified form taken on the line 6—6 of FIG. 5; and FIG. 7 is a perspective view of the second portion of the invention that is illustrated in longitudinal cross-sectional form in FIG. 6.

DESCRIPTION OF THE PREFERRED EMBODIMENTS

The form of tubular fitment A as shown in perspective in FIG. 1 and in cross-section in FIG. 3 is removably connectable to a resilient tube B and to a confined space C defined within a rigid material shell D in which a tapped opening E is formed.

The tubular fitment A includes a first elongate rigid tubular member F that has a first end portion F-1 and second end portion F-2. A first bore 10 extends longitudinally in tubular member F between first and second ring-shaped surface extremities 12 and 14 defined thereon. The first and second end portions F-1 and F-2 have first and second external threads 16 and 18 defined thereon. A first circumferentially extending groove 20 is formed in the outer surface of second end portion F-2 above the second threads 18 as shown in FIG. 3. The upper portion of first groove 20 defines a circumferentially extending first body shoulder 22.

The tubular fitment A also includes a second elongate tubular member G as shown in FIG. 3 that has third and fourth end portions 24 and 26 that have an intermediate portion 28 situated therebetween. A longitudinal passage 30 is defined in second tubular member G. The third end portion 24 has a second circumferentially extending groove 32 defined in the external surface thereof. First means H in the form of circumferentially extending longitudinally spaced barbs are defined on the external surface of the fourth end portion 26, which barbs sealingly engage the interior of the resilient tube B.

A circular flange 34 extends outwardly from the intermediate portion 28. The flange 34 has first and second ring-shaped end faces 36 and 38 as may be seen in FIG. 3. First and second resilient sealing rings 40 and 42 are mounted in the first and second grooves 20 and 32.

Tubular fitment A also includes a collar J shown in FIG. 3, which collar includes a circular internal abutment 43 from which second and third bores 44 and 46 extend in opposite directions. The second bore 44 as may be seen in FIG. 3 extends downwardly and has third threads 48 formed therein.

The use and operation of the tubular fitment A is extremely simple. The tubular fitment A has the second threads 18 on the second end portion F-2 rotated relative to the tapped opening E until the first sealing ring 40 is compressed between first body shoulder 22 and the upper end of shell D to effect a fluid-tight seal therebetween. The first means H on fourth end portion 26 are forced into the interior of resilient tube B to effect a fluid-tight seal therewith.

The second elongate tubular member G has the second sealing ring 42 mounted thereon in slidable sealing contact with the surface of first longitudinal bore 10, and so long as the collar J is loosely screwed onto the first elongate tubular member F the second tubular member G may be rotated relative to the latter without breaking the seal. The second tubular member G is prevented from inadvertently being displaced from the first tubular member F due to abutment 43 limiting the longitudinal movement of second tubular member G and tubing B in non-rotatable relationship with the first tubular member F, the collar J is screwed downwardly on first threads 16 until first and second end faces 36 and 38 are frictionally gripped between abutment 43 and first ring-shaped end surface 10. The second tubular member G and tubing B are easily rendered rotatable relative to first tubular member F by loosening collar J.

The tubular fitment A-1 shown in FIG. 2 is the same in structure as fitment A with the exception that the means H-1 are threads rather than barbs. The threads H-1 permit the fitment A-1 to be connected to an internally threaded tubular member (not shown).

A first alternate form of the tubular fitment A-2 is illustrated in FIG. 4 and a second alternate form A-3 in FIGS. 5 and 6. The first alternate form A-2 differs from the second alternate form only in the number of externally barbed tubular nipples N included as a part thereof. Both the first and second alternate forms A-2 and A-3 of the tubular fitment include the first tubular member F and collar G previously described.

The third alternate form A-3 includes a second tubular member M best seen in FIGS. 6 and 7 that is of elongate shape and includes a first end portion 100, a second end portion 102, and an intermediate portion 104 that has threads 106 defined thereon. The second end portion 102 has a closed end 102a. A longitudinal passage 108 extends upwardly in second tubular member M from first end portion 100 to terminate adjacent closed end 102a. The second tubular member M used with the third alternate form A-3 has two oppositely disposed transverse bores 110 formed in tubular member M adjacent closed end 102a that communicate with passage 108. Each of the transverse bores 110 has a smooth surfaced end portion 112 of a nipple N press-fit and welded therein, with the exposed portion of each nipple having a number of longitudinally spaced, circumferentially extending barbs 114 defined thereon that may sealingly engage the interior surface of a length of tubing B.

The intermediate portion 104 as may be seen in FIG. 6 has external circumferentially extending threads 116 thereon. A rigid ring 118 is provided that has an internal threaded surface 120, an outer ring-shaped surface 122, and first and second ring-shaped faces 124 and 126. The first end portion 100 has a circumferential groove 128 therein that has a resilient sealing ring 130 seated therein.

After the nipples N have been press-fit and welded into the transverse bores 110, the ring-shaped collar J is slid upwardly on second tubular member M, and the ring 118 is screwed onto the threads 106 to provide the assembly shown in FIGS. 5 and 6. The third modified form A-3 of the invention is used in the same manner as the first form A. The collar J in the third form of the invention A-3 may be slidably removed from the second tubular member M after the ring 118 has been unscrewed from the latter.

The second form A-2 of the invention shown in FIG. 4 is of the same structure as the third form A-3, other than the second form has but a single nipple N.

The use and operation of the invention has been described previously in detail and need not be repeated.

What is claimed is:

1. In combination with a rigid shell that has a tapped opening therein and that defines a confined space and a resilient tube, a fitment capable of selectively establishing either rotatable or fixed communication between said resilient tube and said confined space, said fitment including:

a. a first elongate tubular member that has first and second end portions that have a longitudinal smooth surfaced first bore extending therebetween, said first and second end portions having first and second transverse ring shaped surface extremities, said first end portion having first external threads defined thereon, said second end portion having second external threads defined thereon that extend longitudinally from said second ring shaped surface extremity to a transverse circumferentially extending first groove in said second end portion, and a part of said first groove most remote from said second transverse ring shaped extremity defining a first circumferentially extending body shoulder with said second threads engaging said tapped opening;

b. a second elongate tubular member that has third and fourth end portions and an intermediate portion therebetween, a longitudinal passage in said second elongate tubular member that extends between said third and fourth end portions, said third end portion of circular transverse cross section and such size as to snuggly and slidably engage said first longitudinal bore adjacent said first end portion, a second circumferentially extending groove in said third end portion, first means on said fourth end portion for sealingly engaging said resilient tube, and a circumferentially extending flange that projects outwardly from said intermediate portion, said flange having first and second longitudinally spaced ring shaped end faces;

c. first and second resilient sealing rings disposed in said first and second grooves, said first resilient sealing ring being compressed and effecting a fluid tight seal between said body shoulder and said rigid material adjacent said tapped opening when said first sealing ring is compressed, and said second resilient sealing ring effecting a rotatable and slidable seal between said third end portion and said first longitudinal bore when said third end portion is slid longitudinally into the latter to dispose said first ring shaped face adjacent said first ring shaped end surface; and d. a ring shaped collar that has an internal circular abutment from which second and third bores extend longitudinally in opposite directions, said second bore having third threads defined therein, said third bore capable of being slid downwardly over said flange for said third threads to engage said first threads, said second tubular member and said resilient tubing capable of being rotated relative to said first tubular member until said collar is screwed downwardly on said first threads to the extent said first and second ring shaped faces of said flange are frictionally gripped between said first ring shaped surface and said abutment to the extent rotation of said second tubular member relative to said first tubular member is no longer possible.

2. A tubular fitment as defined in claim 1 in which said first means are a plurality of circumferentially extending, longitudinally spaced barbs defined on the exterior surface of said fourth end portion.

3. A tubular fitment as defined in claim 1 in which said passage terminates in said fourth end portion prior to the free end thereof, a transverse bore in said fourth end portion that communicates with said passage, with said first means being a tubular nipple that has a smooth surfaced external cylindrical end portion that is press-fit into sealing engagement with said transverse bore, and said nipple having a plurality of circumferentially extending longitudinally spaced barbs on the exposed outer surface thereof.

4. A tubular fitment as defined in claim 3 in which said flange is an internally threaded rigid ring that is screwed onto threads defined on said intermediate portion.

5. A tubular fitment as defined in claim 3 in which a plurality of circumferentially spaced transverse bores are defined in said fourth end portion, and a plurality of said nipples that are press-fit into said transverse bores.

6. A tubular fitment as defined in claim 1 in which said first means are threads defined on the external surface of said fourth end portion that may engage a second tapped opening leading to a second confined space.

* * * * *